US010937027B1

(12) United States Patent
Sokol et al.

(10) Patent No.: US 10,937,027 B1
(45) Date of Patent: Mar. 2, 2021

(54) SYSTEMS AND METHODS FOR MANAGING TOKEN-BASED TRANSACTIONS

(71) Applicant: JPMorgan Chase Bank, N.A., New York, NY (US)

(72) Inventors: Benjamin Sokol, New York, NY (US); Ryan Andrew Schlosser, New York, NY (US); Jordan Butler, New York, NY (US); Howard Spector, Woolwich, NJ (US); Scott H. Ouellette, Kingston, NH (US); Winter P. Ng, Lutz, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 893 days.

(21) Appl. No.: 15/345,942

(22) Filed: Nov. 8, 2016

(51) Int. Cl.
*G06Q 30/00* (2012.01)
*G06Q 20/40* (2012.01)
*G06Q 20/36* (2012.01)

(52) U.S. Cl.
CPC ..... *G06Q 20/4014* (2013.01); *G06Q 20/3674* (2013.01)

(58) Field of Classification Search
CPC .................................................. G06Q 20/38
USPC ..................................... 705/44, 1.1, 16, 26.1
See application file for complete search history.

(56) References Cited

U.S. PATENT DOCUMENTS

| 9,195,984 | B1* | 11/2015 | Spector | G06Q 20/322 |
| 2014/0344153 | A1* | 11/2014 | Raj | G06Q 20/385 |
| | | | | 705/44 |
| 2017/0091757 | A1* | 3/2017 | Lloyd | G06Q 20/227 |

OTHER PUBLICATIONS

NPL Search History.*

* cited by examiner

*Primary Examiner* — John H. Holly
(74) *Attorney, Agent, or Firm* — Greenberg Traurig LLP (57) ABSTRACT

Systems and methods for managing token-based transactions are disclosed. According to one embodiment, a method for managing token-based transactions may include (1) a token manager server comprising at least one computer processor receiving, from a customer, a request to provide a payment token to a merchant; (2) the token manager server receiving, from the customer, an identification of a first financial instrument and a second financial instrument to associate with the payment token; (3) the token manager server receiving, from the customer, an allocation of a transaction between the first financial instrument and the second financial instrument; (4) the token manager server generating the payment token and associating the payment token with the first financial instrument and the second financial instrument; and (5) the token manager server providing the payment token to the merchant.

20 Claims, 3 Drawing Sheets

Figure 3

# SYSTEMS AND METHODS FOR MANAGING TOKEN-BASED TRANSACTIONS

BACKGROUND OF THE INVENTION

1. Field of the Invention

The present invention generally relates to systems and methods for managing token-based transactions.

2. Description of the Related Art

It is commonplace for customers to purchase items online. Typically, the customer will select an item and go to a "checkout screen" where the user then enters his or her credit card information, billing address, and shipping address. The merchant then provides this information to a financial institution to authorize the underlying transaction.

SUMMARY OF THE INVENTION

Systems and methods for managing token-based transactions are disclosed. According to one embodiment, a method for managing token-based transactions may include (1) a token manager server comprising at least one computer processor receiving, from a customer, a request to provide a payment token to a merchant; (2) the token manager server receiving, from the customer, an identification of a first financial instrument and a second financial instrument to associate with the payment token; (3) the token manager server receiving, from the customer, an allocation of a transaction between the first financial instrument and the second financial instrument; (4) the token manager server generating the payment token and associating the payment token with the first financial instrument and the second financial instrument; and (5) the token manager server providing the payment token to the merchant.

In one embodiment, the method may further include the token manager server receiving, from the customer, at least one condition that specifies the allocation of a transaction between the first financial instrument and the second financial instrument; and the token manager associating the payment token with the at least one condition. The condition may include a merchant identifier, a transaction amount, a transaction location, a time in a billing cycle, and a type of goods or services.

In one embodiment, the first financial instrument and the second financial instrument may be a credit card, a bank account, etc.

In one embodiment, the payment token may be associated with a single merchant, or it may be associated with more than one merchant.

In another embodiment, a method for managing token-based transactions may include (1) a token manager server comprising at least one computer processor receiving, from a first customer, a request to provide a payment token to a merchant; (2) the token manager server receiving, from the first customer, an identification of a first financial instrument associated with the first customer to associate with the payment token; (2) the token manager server receiving, from the second customer, an identification of a second financial instrument associated with the second customer to associate with the payment token; (3) the token manager server receiving, from at least one of the first customer and the second customer, an allocation of a transaction between the first financial instrument and the second financial instrument; (4) the token manager server generating the payment token and associating the payment token with the first financial instrument and the second financial instrument; and (5) the token manager server providing the payment token to the merchant.

In one embodiment, the method may further include the token manager server receiving, from the customer, at least one condition that specifies the allocation of a transaction between the first financial instrument and the second financial instrument. The condition may include a merchant identifier, a transaction amount, a transaction location, a time in a billing cycle, and a type of goods or services.

In one embodiment, the method may further include the token manager server receiving authorization from the second customer to associate the second financial instrument with the payment token.

In one embodiment, the first financial instrument and the second financial instrument may be a credit card, a bank account, etc.

In one embodiment, the payment token may be associated with a single merchant, or it may be associated with more than one merchant.

In another embodiment, a method for conducting a token-based transaction may include (1) a token manager server comprising at least one computer processor receiving, from a merchant, a transaction request comprising a transaction amount and a payment token; (2) the token manager server retrieving an identification of a first financial instrument and a second financial instrument that are associated with the payment token; (3) the token manager server retrieving an allocation for the transaction between the first financial instrument and the second financial instrument; (4) the token manager server dividing the transaction into a first portion for the first financial instrument and a second portion for the second financial instrument based on the allocation; and (5) the token manager server presenting the first portion of the transaction to a first financial institution associated with the first financial instrument, and the second portion of the transaction to a second financial institution associated with the second financial instrument.

In one embodiment, the allocation may identify at least one condition that specifies the allocation of a transaction between the first financial instrument and the second financial instrument. The condition may include a merchant identifier, a transaction amount, a transaction location, a time in a billing cycle, and a type of goods or services.

In one embodiment, the first financial instrument and the second financial instrument may be a credit card, a bank account, etc.

In one embodiment, the method may further include the token manager server verifying that the token is authorized for the merchant.

In one embodiment, the first financial instrument may be associated with a first customer, and the second financial instrument may be associated with a second customer.

In one embodiment, the first financial institution and the second financial institution may be the same.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
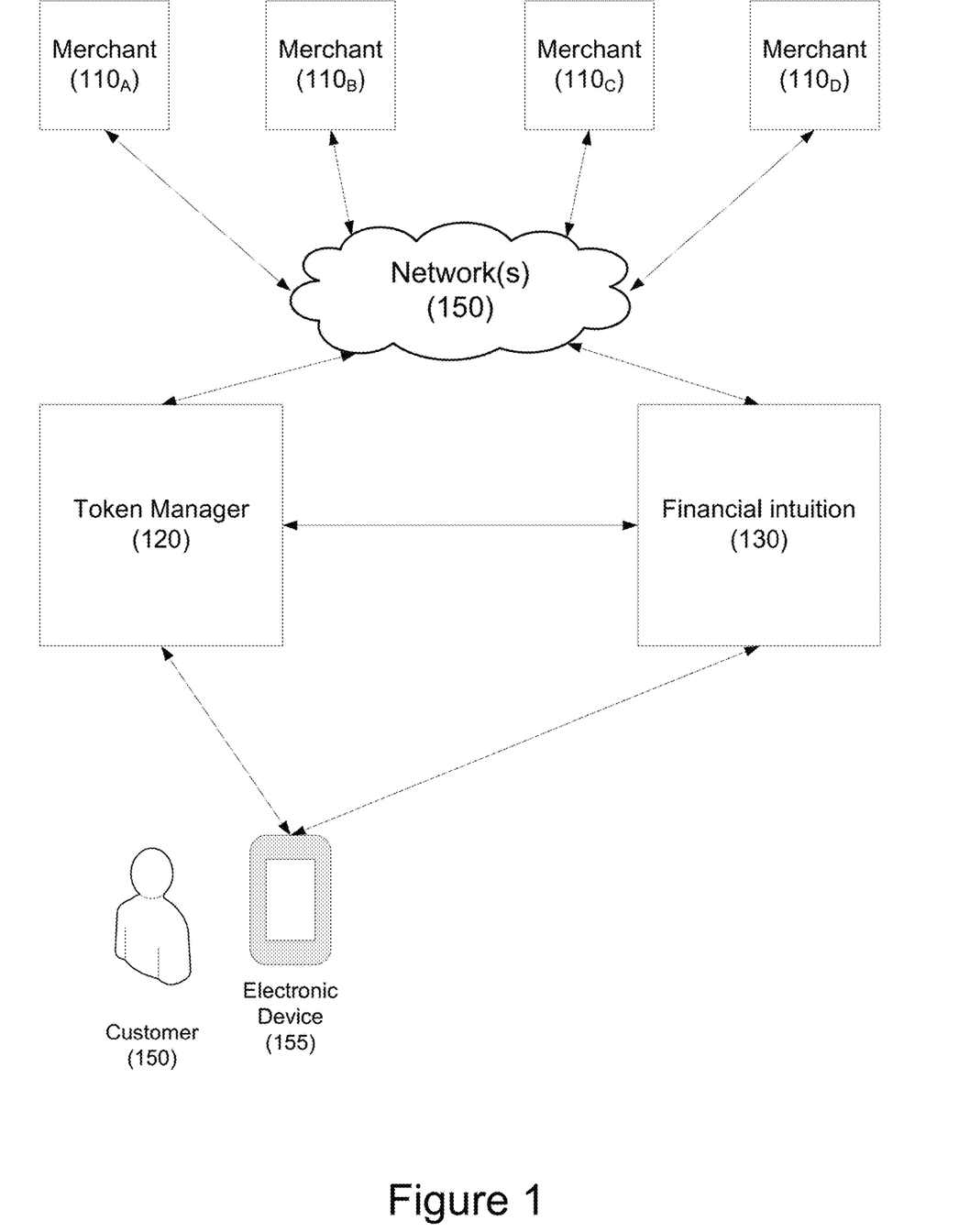
FIG. 1 depicts a system for managing token-based transactions according to one embodiment.
Figure 2:
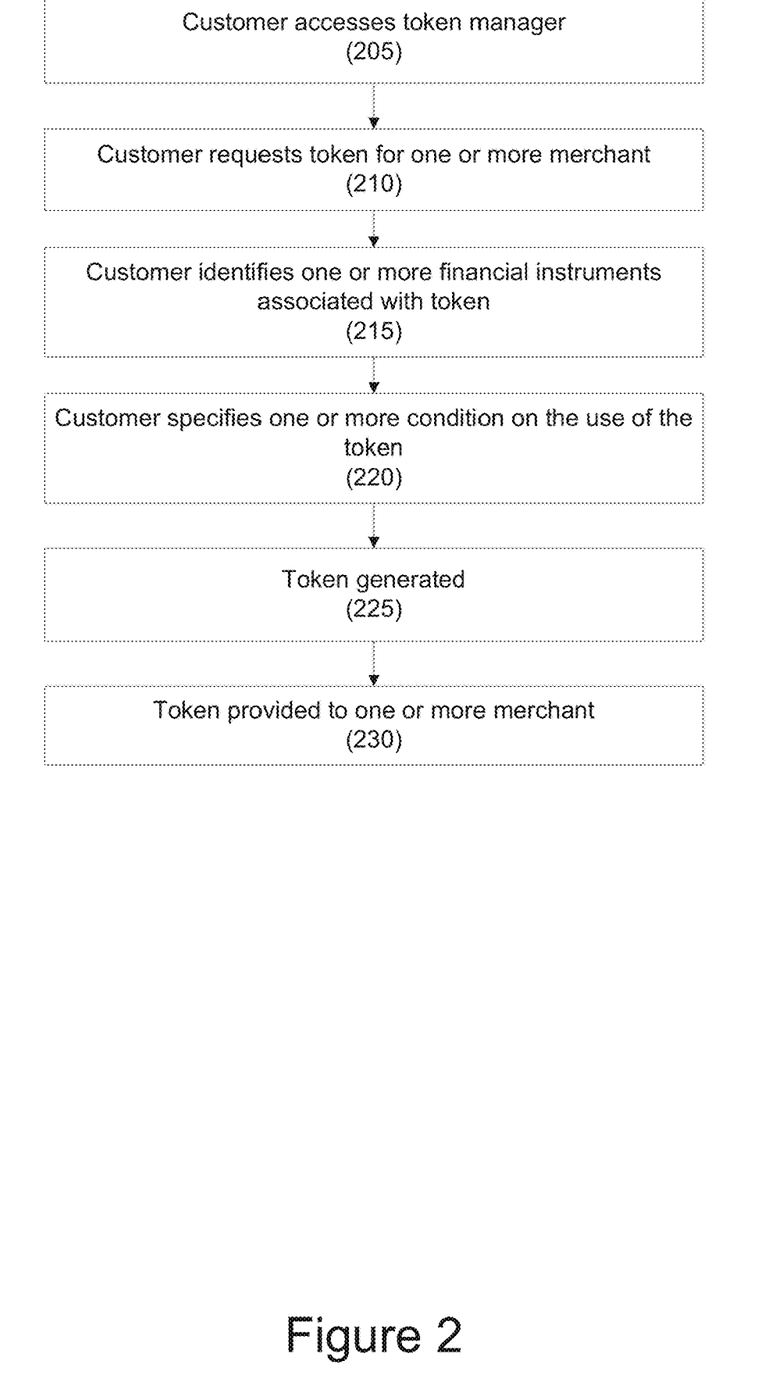
FIG. 2 depicts a method for managing token-based transactions according to one embodiment.
Figure 3:
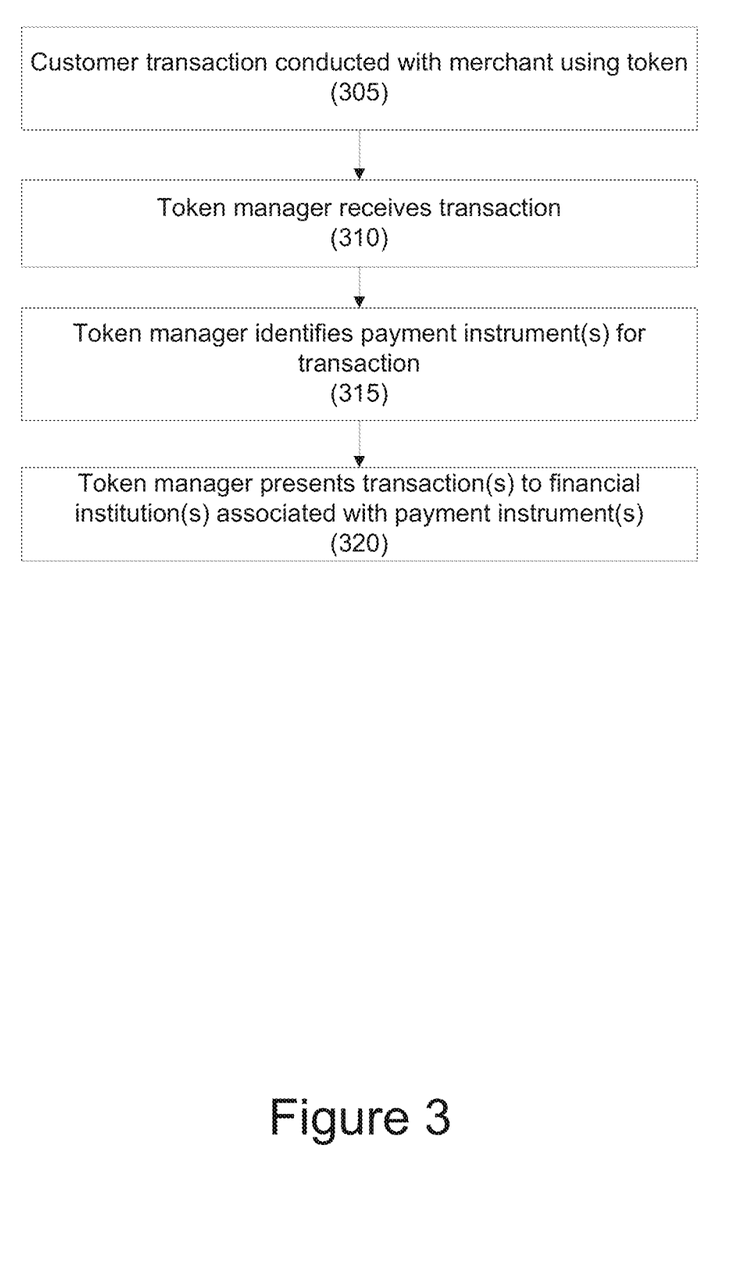
FIG. 3 depicts a method for managing token-based transactions according to one embodiment.

Several embodiments of the present invention and their advantages may be understood by referring to FIGS. 1-3.

Embodiments disclosed herein relate to systems and methods for managing token-based transactions.

Referring to FIG. 1, a system for managing token-based transactions is disclosed according to one embodiment. System 100 may include a plurality of merchants 110, which may be providers of goods or services, token manager 120, and financial institution 130. Merchants 110, token manager 120, and financial institution 130 may communicate using one or more network(s) 150. Network(s) 150 may include payment networks, communications networks, etc.

Financial institution 130 may be any financial institution with which customer 150 may maintain a financial transaction account, such as a credit card, a checking account, etc. In addition, customer 130 may have a line of credit or a non-traditional payment account (e.g., a home equity line of credit) with financial institution 130. In one embodiment, financial institution 130 may offer a line of credit, incentives, rewards, etc. to customer 150.

In one embodiment, financial institution 130 may host token manager 120. In another embodiment, token manager 120 may be a third party.

In one embodiment, customer 150 may have one more accounts with financial institution 130, and may interact with one or more merchants 110 either on-line or in person. In one embodiment, customer 110 may be a repeat customer with one or more merchant $110_A$-$110_D$.

Token manager 120 may facilitate customer 150's ability to conduct card-on-file or recurring transactions with one or more merchant $110_A$-$110_D$. In one embodiment, token manager 120 may manage a token that may be provided to one or more merchant $110_A$-$110_D$. A single token may be provided to a plurality of merchants $110_A$-$110_D$, or a single token may be provided to more than one merchant 110.

In one embodiment, token manager 120 may manage tokens that may be provided by financial institution 130 and/or a payment processing network (e.g., VisaNet).

Token manager 120 may provide an interface through which customer 150 may manage its subscriptions. In one embodiment, customer 150 may access this interface using electronic device 155, which may be, for example, a smartphone, tablet computer, desktop computer, notebook computer, Internet of things appliance, etc.

In one embodiment, customer 150 may request that token manager 120 provide a recurring payment token to one or more merchant, and may specify conditions on the use of that token. For example, customer 150 may specify one or more specific merchant(s) 110 for the token, an expiration date and/or time for the token, an authorized user of the token, etc. Any other suitable conditions on the token may be used as is necessary and/or desired.

In one embodiment, the token may be associated with one or more transaction accounts. For example, customer 150 may specify one or more financial instrument that are used as payment accounts for the token. Customer 150 may specify a hierarchy in which the financial instruments are used (e.g., use credit card A as a default card, then use credit card B); certain conditions on using the financial instruments (e.g., use an airline cobrand credit card when purchasing airline tickets), etc. Other conditions for identifying the financial instrument to use, such as the merchant identity, the merchant type, the nature of the goods or services, the geographical location, the time of day, and any other suitable conditions may be used as necessary and/or desired.

In one embodiment, the hierarchy may be dynamic, in which the financial instruments may be selected based on incentives, discounts, rewards, etc. that will be earned by using that particular financial instrument.

In one embodiment, customer 150 may specify more than one financial instrument that may be used as payment accounts for a transaction with the token. For example, customer 150 may specify that a transaction with the token is split 60% to a first financial instrument, and 40% to a second financial instrument. Any suitable number of financial instruments may be used, and additional conditions, such as those discussed above, may be used as is necessary and/or desired.

In one embodiment, financial institution 130 may offer customer 150 a line of credit should none of the financial instruments be available. In another embodiment, financial institution 130 may present offers (e.g., installment payments, deferred interest, etc.) to customer 150.

In one embodiment, when a financial instrument is cancelled or expires, or otherwise unable to conduct the transaction, token manager 120 may request a replacement financial instrument from customer 150 and/or financial institution 130. Alternatively, token manager 130 may charge the transaction to customer's line of credit.

In one embodiment, one of the financial instruments may be from a third party. For example, customer 150 may have a roommate (not shown), and customer 150 and the roommate may split a utility bill. The roommate may provide customer 150 with information for his or her financial instrument that may be used to pay for a portion of the transaction using the token. In another embodiment, the roommate may provide this information to token manager 120 directly.

In one embodiment, token manager 120 may request confirmation of the hierarchy of financial instruments using, for example, SMS, etc. In one embodiment, token manager 120 may use machine learning to learn the hierarchy of financial instruments.

In one embodiment, token manager 120 may generate the token that is provided to one or more merchant $110_A$-$110_D$. In another embodiment, token manager 120 may request financial institution 130 and/or payment network (not shown) to generate the token.

In one embodiment, token manager 120 may maintain the "mapping" between the token(s) and the financial instrument(s) that are associated with the token. Token manager 120 may further provide fraud protection. For example, if a token is issued to merchant $110_A$, but a transaction is received using that token from merchant $110_C$, token manager 120 may identify the transaction as fraudulent.

In one embodiment, token manager 120 may provide lifecycle management for the token. For example, if the token is compromised, token manager 120 may automatically cancel the token and generate a new token and provide that to the merchant.

Referring to FIG. 2, a method for managing token-based transactions is disclosed according to one embodiment.

In step 205, the customer may access a token manager to establish a recurring or card-on-file type of payment arrangement with one or more merchant. As discussed above, the token manager may be hosted by or associated with a financial institution with which the customer has an account or that has issued a financial instrument to the customer. In another embodiment, the token manager may be a third party and may interact with a plurality of financial institutions.

In step 210, the customer may request that a token be provisioned for one or more merchant. In one embodiment, the token may be provisioned for a single merchant (e.g., a merchant-specific token), or for a plurality of merchants.

In step 215, the customer may identify one or more financial instruments that may be associated with the token. For example, the customer may specify a single financial instrument or account, such as a credit card, a checking account, etc., that the token manager may associate with the token. As another example, the customer may specify multiple financial instruments that may be used together (e.g., split the transaction among multiple financial instruments or accounts as desired), or may specify a hierarchy of financial instruments to be used.

In step 220, the customer may specify certain conditions under which each financial instrument is to be used. For example, the customer may identify one or more merchant, one or more type of good or service, one or more type of merchant, etc. with which each financial instrument is to be used. The customer may also specify a transaction amount or range of transaction amount, a geolocation, a date/time range (e.g., where the transaction falls in a billing cycle), rewards programs, incentives, etc. for each financial instrument. The customer may also specify that the selection of financial instruments may be dynamic such as to maximize rewards, incentives, etc.

In one embodiment, the customer may specify a percentage by which a transaction may be split among two or more financial instruments and/or accounts. For example, a user may specify to have a transaction split three ways, with 30% charged to a first credit card, 30% charged to a second credit card, and 40% debited from a checking account. The user may specify the percentages depending on merchant, amount, type of transaction, time of the billing cycle, etc., or as necessary and/or desired.

In one embodiment, the customer may provide reward/loyalty account information.

The token manager may store the association between the token and the financial instruments, including the user-identified conditions. In one embodiment, the token manager may provide this information to the respective financial institutions associated with the token.

In step 225, the token may be generated. In one embodiment, the token manager may generate the token. In another embodiment, the financial institution may generate the token. In still another embodiment, a payment network may generate the token.

In step 230, the token manager may provide the token to one or more merchant. Alternatively, the financial institution and/or payment network may provide the token to one or more merchant.

Referring to FIG. 3, a method of conducting a subscription-based token-based transaction is disclosed according to one embodiment.

In step 305, a customer transaction may be conducted with a merchant using a token that the merchant may already possess. In one embodiment, the transaction may be a recurring transaction, a card on file transaction using a token, etc. In another embodiment, the payment may be a peer-to-peer payment (e.g., Venmo), a bill payment, etc.

In step 310, the token manager receives transaction from merchant. In one embodiment, the token manager may receive a merchant identifier (e.g., merchant name, ID, MCC, location, etc.), an identification of the goods/services, the transaction amount, whether it is a card on file or recurring transaction, etc.

In one embodiment, the transaction may be routed to the token manager based on the token. In another embodiment, the transaction may be routed to the token manager via a financial institution and/or payment network that may have provisioned the token to the merchant.

In one embodiment, the token manager may check that the token is not being used fraudulently. For example, if a token is provisioned only for use with a first merchant, and it is received from a second merchant, the transaction may be denied. Appropriate actions, such as cancelling the association between the token and any financial accounts, informing the associated financial institutions, informing the customer, etc. may be taken as necessary and/or desired.

In step 315, the token manager may identify one or more payment instruments for the transaction. In one embodiment, the token manager may perform a look-up to identify the financial instrument(s) to charge, and any rules/conditions on their use.

In one embodiment, the token manager may apply the hierarchy and/or conditions to identify the financial instrument(s) to use for the transaction. In another embodiment, the token manager may dynamically identify the financial instrument(s) to meet a customer objective such as maximizing rewards and/or incentives, charging certain financial instruments based on balance, timing of the billing cycle, etc.

In step 320, the token manager may initiate one or more transactions for the financial instrument(s). In one embodiment, the token manager may pass the transaction to each financial institution(s) on behalf of the merchant along with the identified financial instrument(s). In another embodiment, the token manager may conduct the charge on behalf of the merchant, and may then pay the merchant upon receipt of the funds.

In one embodiment, the token manager may offer a line of credit to the customer for large purchases, if there are insufficient funds of credit available, etc. In one embodiment, this may be offered by the issuing financial institution, or a different financial institution. Similarly, the token manager may offer incentives (e.g., installment payments, deferred interest, etc.) on behalf of a financial institution.

Exemplary non-limiting use cases that illustrate embodiments are provided below.

As a first example, a customer is subscribed to an on-line music service, and loses the debit card that is used to pay for that service. Rather than the customer ending the subscription while waiting for a replacement card to arrive in the mail, the customer's tokenized account may automatically pay for the subscription fee using a secondary financial instrument and/or a line of credit.

As a second example, brother and sister share a family phone plan, with the brother paying 75% of the plan and the sister paying 25%. Instead of each charging their respective amount, the brother and sister may each associate a financial instrument with the token that is provided to the wireless provider, and the token manager may divide the bill appropriately and presented to each financial institution for payment.

When setting up the token-based account, the brother and/or sister may set up the logic/rules for funding the transactions. For example, if there are overages and the wireless bill is larger than expected, the brother and/or sister may be notified and may adjust their funding percentages. Both the brother and sister may be required to approve any changes to the allocation, or the transactions themselves. At any time, the brother and/or sister may access the portal to make adjustments.

As a third example, a customer has a child going to college and wants to see and manage what the child is purchasing with a credit card. The customer may use the platform to manage how much the child spends on subscriptions, and which subscriptions they are using.

As a fourth example, a customer purchases $50 of goods from a merchant. Based on pre-determined rules in the customer's account, the transaction is over $20, so instead of pulling funds from the checking account, two pre-selected credit cards are used via the tokenized instrument. This can be in the form of a QR code, character string, or any other suitable way. Because the merchant has accepted the tokenized financial instrument, there may be a discount applied to the transaction fees charged for the purchase.

Although several embodiments have been disclosed, it should be recognized that the embodiments are not necessarily exclusive.

The following disclosures are hereby incorporated, by reference, in their entireties: U.S. patent application Ser. No. 14/774,608, filed Jun. 19, 2015; U.S. patent application Ser. No. 14/669,511, filed Apr. 29, 2015; U.S. Provisional Patent Application Ser. No. 62/148,493, filed Apr. 16, 2015; U.S. Provisional Patent Application Ser. No. 62/107,800, filed Jan. 26, 2015; and U.S. Provisional Patent Application Ser. No. 62/037,891, filed Aug. 15, 2014.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for managing token-based transactions, comprising:
   a token manager server comprising at least one computer processor receiving, from a customer electronic device, a request to provide a payment token to a merchant;
   the token manager server receiving, from the customer electronic device, an identification of a first financial instrument and a second financial instrument to associate with the payment token, the customer electronic device comprising a user interface configured to receive a selection of the first financial instrument and a second financial instrument by a customer using the customer electronic device to generate the payment token;

the token manager server receiving, from the customer electronic device, an allocation value of a transaction between the first financial instrument and the second financial instrument, the allocation value corresponding a percentage by which the transaction is split between at least the first financial instrument and the second financial instrument, wherein the user interface is configured to receive a selection of the allocation value to generate the payment token;

the token manager server generating the payment token according to the allocation value and associating the payment token with the first financial instrument and the second financial instrument; and the token manager server providing the payment token as a single token to the merchant, wherein the token manager server is configured to receive a transaction request, the transaction request comprising the payment token and a merchant identifier, and wherein the token manager server is configured to deny the transaction request based on the merchant identifier of the transaction request being different from a merchant identifier associated with the payment token.

2. The method of claim 1, further comprising:

the token manager server receiving, from the customer electronic device, at least one condition that specifies the allocation of a transaction between the first financial instrument and the second financial instrument, wherein the user interface is configured to receive a selection of the at least one condition to generate the payment token; and the token manager server associating the payment token with the at least one condition.

3. The method of claim 2, wherein the at least one condition comprises a merchant identifier, a transaction amount, a transaction location, a time in a billing cycle, and a type of goods or services.

4. The method of claim 1, wherein the first financial instrument and the second financial instrument comprise at least one of a credit card and a bank account.

5. The method of claim 1, wherein the payment token is associated with a plurality of merchants.

6. The method of claim 1, further comprising the token manager server storing a mapping that maps the payment token to both the first and second financial instrument.

7. A method for managing token-based transactions, comprising:

a token manager server comprising at least one computer processor receiving, from a first customer electronic device, a request to provide a payment token to a merchant;

the token manager server receiving, from the first customer electronic device, an identification of a first financial instrument associated with a first customer to associate with the payment token, the first customer electronic device comprising a first user interface configured to receive a selection of the first financial instrument by the first customer to generate the payment token;

the token manager server receiving, from a second customer electronic device, an identification of a second financial instrument associated with a second customer to associate with the payment token, the second customer electronic device comprising a second user interface configured to receive a selection of the second financial instrument by the second customer to generate the payment token;

the token manager server receiving, from at least one of the first customer and the second customer, an allocation value of a transaction between the first financial instrument and the second financial instrument, the allocation value corresponding a percentage by which the transaction is split between at least the first financial instrument and the second financial instrument;

the token manager server generating the payment token according to the allocation value and associating the payment token with the first financial instrument and the second financial instrument; and the token manager server providing the payment token as a single token to the merchant, wherein the token manager server is configured to receive a transaction request, the transaction request comprising the payment token and a merchant identifier, and wherein the token manager server is configured to deny the transaction request based on the merchant identifier of the transaction request being different from a merchant identifier associated with the payment token.

8. The method of claim 7, further comprising:

the token manager server receiving, from the first customer, at least one condition that specifies the allocation value of a transaction between the first financial instrument and the second financial instrument.

9. The method of claim 8, wherein the at least one condition comprises a merchant identifier, a transaction amount, a transaction location, a time in a billing cycle, and a type of goods or services.

10. The method of claim 7, further comprising:

the token manager server receiving authorization from the second customer to associate the second financial instrument with the payment token.

11. The method of claim 7, wherein the first financial instrument and the second financial instrument comprise at least one of a credit card and a bank account.

12. The method of claim 7, wherein the payment token is associated with a plurality of merchants.

13. The method of claim 7, further comprising the token manager server storing a mapping that maps the payment token to both the first and second financial instrument.

14. A method for conducting a token-based transaction, comprising:

a token manager server comprising at least one computer processor receiving, from a merchant, a transaction request comprising a transaction amount and a payment token;

the token manager server retrieving an identification of a first financial instrument and a second financial instrument that are associated with the payment token by accessing a mapping that maps the payment token to the first financial instrument and to the second financial instrument;

the token manager server retrieving an allocation value for the transaction between the first financial instrument and the second financial instrument, the allocation value corresponding a percentage by which the transaction amount is split between at least the first financial instrument and the second financial instrument, wherein the allocation value, the first financial instrument, and the second financial instrument are selected by at least one customer from at least one user interface using at least one customer electronic device;

the token manager server dividing the transaction into a first portion for the first financial instrument and a second portion for the second financial instrument based on the allocation value; and the token manager server presenting the first portion of the transaction to a first financial institution associated with the first financial instrument, and the second portion of the transaction to a second financial institution associated with the second financial instrument.

15. The method of claim 14, wherein the allocation value identifies at least one condition that specifies the allocation of a transaction between the first financial instrument and the second financial instrument.

16. The method of claim 15, wherein the at least one condition comprises a merchant identifier, a transaction amount, a transaction location, a time in a billing cycle, and a type of goods or services.

17. The method of claim 14, wherein the first financial instrument and the second financial instrument comprise at least one of a credit card and a bank account.

18. The method of claim 14, further comprising:
the token manager server verifying that the payment token is authorized for the merchant.

19. The method of claim 18, wherein the first financial instrument is associated with a first customer, and the second financial instrument is associated with a second customer.

20. The method of claim 14, wherein the first financial institution and the second financial institution are the same.

* * * * *